United States Patent [19]
Nobuta

[11] Patent Number: 6,097,504
[45] Date of Patent: *Aug. 1, 2000

[54] FACSIMILE APPARATUS USING STANDARDIZED AND PROPRIETARY TYPES OF PASSWORDS

[75] Inventor: Hiroshi Nobuta, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/343,227

[22] Filed: Nov. 22, 1994

[30] Foreign Application Priority Data

Nov. 26, 1993 [JP] Japan ................................ 5-296830

[51] Int. Cl.[7] .................................................. H04N 1/00
[52] U.S. Cl. ..................... 358/434; 358/440; 379/93.03; 379/100.1
[58] Field of Search .................................... 358/434, 435, 358/436, 438, 439, 440; 380/18, 23; 379/93, 100, 100.1, 93.01, 93.03

[56] References Cited

U.S. PATENT DOCUMENTS 4,524,393  6/1985  Ohzeki .................................... 358/438
5,168,376  12/1992  Motohama .............................. 358/437

FOREIGN PATENT DOCUMENTS 58-1374  1/1983  Japan ..................................... 358/436

*Primary Examiner*—Thomas D. Lee
*Attorney, Agent, or Firm*—Morgan & Finnegan, LLP

[57] ABSTRACT

A facsimile apparatus includes a call control unit, a transmission control unit for performing communication with a distant partner apparatus, a unit, using the transmission control unit, for sending/receiving a plurality of pieces of password information of different types during the communication with the partner apparatus, the pieces of password information including password information of a scheme unique to a maker and password information of a standardized scheme for apparatuses capable of intercommunication, an input unit for inputting the plurality of pieces of password information, a recording unit for storing the plurality of pieces of password information, and a selecting unit for selectively controlling a password communication operation by the plurality of pieces of password information.

66 Claims, 12 Drawing Sheets

FIG. 7A  SET IDENTIFY MODE
         1. ONLY PASS WORD A

FIG. 7B  SET IDENTIFY MODE
         2. ONLY PASS WORD B

FIG. 7C  SET IDENTIFY MODE
         3. EITHER PASS WORD A OR B

FIG. 7D  SET IDENTIFY MODE
         4. BOTH PASS WORDS A AND B

| PASS WORD A | 01101011 (8-BIT) |
|---|---|
| PASS WORD B | 2143 (CHARACTER STRING 32h, 31h, 34h, 33h) |
| IDENTIFY MODE | 3 |

FIG. 14

| | MAKER A NEW TYPE | MAKER A OLD TYPE | MAKER B NEW TYPE | MAKER B OLD TYPE |
|---|---|---|---|---|
| MAKER A NEW TYPE | EACH OF PWD AND NSS AVAILABLE | ONLY NSS AVAILABLE | ONLY PWD AVAILABLE | X |
| MAKER A OLD TYPE | ONLY NSS AVAILABLE | ONLY NSS AVAILABLE | X | X |
| MAKER B NEW TYPE | ONLY PWD AVAILABLE | X | EACH OF PWD AND NSS AVAILABLE | ONLY NSS AVAILABLE |
| MAKER B OLD TYPE | X | X | ONLY NSS AVAILABLE | ONLY NSS AVAILABLE |

FIG. 15

| COMPOSITION OF CLOSED AREA GROUP | | PASS WORD IDENTIFYING METHOD |
|---|---|---|
| CASE (1) EACH EQUIP IS OF OLD TYPE AND MADE BY THE SAME MAKER | | IDENTIFICATION OF PASS WORD A SET IN NSS |
| CASE (2) EACH EQUIP IS OF NEW TYPE AND MADE BY THE SAME MAKER | 1 | IDENTIFICATION OF PASS WORD A SET IN NSS |
| | 2 | IDENTIFICATION OF PASS WORD B SET IN PWD |
| | 3 | IDENTIFICATION OF EITHER PASS WORD A SET IN NSS OR PASS WORD B SET IN PWD |
| | 4 | IDENTIFICATION OF BOTH PASS WORD A SET IN NSS AND PASS WORD B SET IN PWD |
| CASE (3) EACH EQUIP IS OF NEW TYPE, BUT MADE BY DIFFERENT MAKER | | IDENTIFICATION OF PASS WORD B SET IN PWD |
| CASE (4) EACH EQUIP IS MADE BY THE SAME MAKER, BUT OF DIFFERENT TYPE | 1 | IDENTIFICATION OF PASS WORD A SET IN NSS |
| | 2 | IDENTIFICATION OF EITHER PASS WORD A SET IN NSS OR PASS WORD B SET IN PWD |

FACSIMILE APPARATUS USING STANDARDIZED AND PROPRIETARY TYPES OF PASSWORDS

BACKGROUND OF THE INVENTION

1. Field of the Invention

The present invention relates to a password communication faculty of a facsimile apparatus for communicating with another station through a communication line.

2. Related Background Art

There are conventionally some networks which provide closed area connection as one of communication network services. Some communication terminal units such as facsimile apparatuses also provide closed area connection communication faculty using a password or the like between stations which can be interconnected. A password on such a station side is used as a convenient faculty for the user of a station when no closed area connection service is provided by the network, or when an extra charge is required to receive the service of the network.

The password communication faculty of a station is a faculty of communicating with only a partner apparatus which sends a password coincident with password information registered in the apparatus in advance. Many of currently available facsimile apparatuses based on the G3 and G4 recommendations of the CCITT have this faculty. Conventionally, however, standards of password communication are not defined in the above recommendations, so that each maker has realized the password communication faculty by a unique method, that is, a proprietary format. Therefore, password communication is conventionally enabled in communication between apparatuses made by the same maker. Users who intend password communication must purchase apparatuses of the same maker.

In a recent CCITT recommendation, however, a password communication signal is standardized to enable password communication between apparatuses made by different makers. Along with the standardization, users can also purchase apparatuses of different makers to utilize the closed area connection by password communication.

FIG. 5 is a view showing a closed area connection state wherein an apparatus having the standardized password faculty is defined as a "new type" and an apparatus having only the original password faculty of a maker is defined as an "old type" (defined from the viewpoint of a maker A). The reference numeral 5-1 denotes a network, a closed area group 5-2 is constituted by only conventional apparatuses made of the same maker. In this case, only the original password faculty of the maker can be used. In a closed area group 5-3 constituted by only apparatuses made by the same maker, the standardized password faculty can also be used. In a closed area group 5-4 constituted by apparatuses made of different makers, only the standardized password faculty can be used. In a closed area group 5-5 constituted by only apparatuses made of the same maker, apparatuses of a "new type" and an "old type" are simultaneously present. These closed area groups can be considered on the market. The users of each group are assumed to use a different method using the two passwords.

For example;

(1) Upon introduction of an apparatus of a "new type" and made of the maker A, the group 5-2 is required:
a. to use only the original password faculty of the maker A and not to use the standardized password faculty.

(2) Upon introduction of an apparatus of a "new type" and made of the maker A, the group 5-3 is required:

a. to use only the original password faculty of the maker A and not to use the standardized password faculty;
b. to use only the standardized password faculty and not to use the original password faculty of the maker A;
c. to use both the original password faculty of the maker A and the standardized password faculty, thereby performing communication when one of the faculties is coincident; or
d. to use both the original password faculty of the maker A and the standardized password faculty, thereby performing communication when both the faculties are coincident.

(3) Upon introduction of an apparatus of a "new type" and made by the maker A, the group 5-4 is required:
a. to use only the standardized password faculty and not to use the original password faculty of the maker A; or
b. to use both the original password faculty of the maker A and the standardized password faculty, thereby performing communication when one of the faculties is coincident.

(4) Upon introduction of an apparatus of a "new type" and made by the maker A, the group 5-5 is required:
a. to use only the original password faculty of the maker A and not to use the standardized password faculty; or
b. to use both the original password faculty of the maker A and the standardized password faculty, thereby performing communication when one of the faculties is coincident.

However, no conventional apparatus can cope with all these required conditions.

SUMMARY OF THE INVENTION

The present invention has been made in consideration of the above drawback of the prior art, and has as its object to improve a facsimile apparatus.

The present invention has been made in consideration of the above drawback of the prior art, and has as another object to provide a facsimile apparatus for performing image data communication using a plurality of passwords of different types.

BRIEF DESCRIPTION OF THE DRAWINGS

FIGS. 7A to 7D are views showing a display example of the embodiment;

FIG. 14 is a table showing passwords available for the apparatus of the embodiment; and FIG. 15 is a table showing passwords used in the closed area groups of the embodiment.

DETAILED DESCRIPTION OF THE PREFERRED EMBODIMENTS

Figure 1:
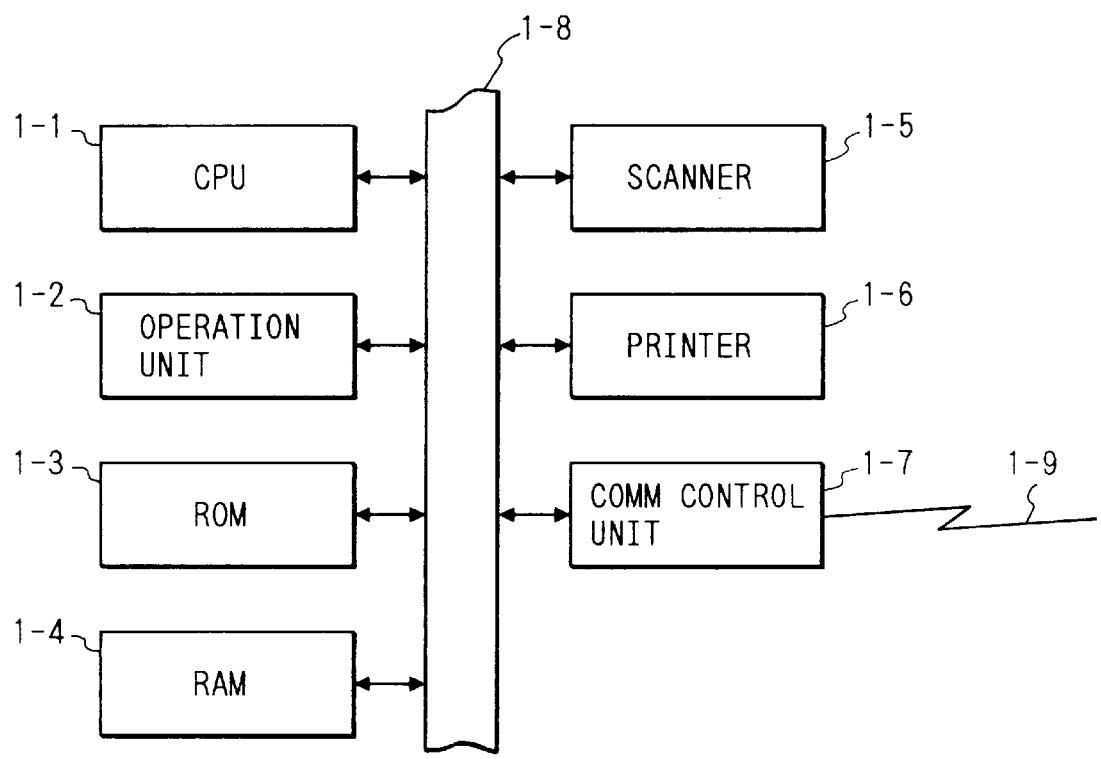
FIG. 1 is a block diagram showing an embodiment.

FIG. 1 is a block diagram showing a facsimile apparatus according to the present invention. This facsimile apparatus is based on the CCITT recommendation G3 standards and used in connection to a public telephone network (PSTN).

The facsimile apparatus includes a known CPU 1-1 for controlling a system, a known ROM (Read Only Memory) 1-3 for storing a program, and a known RAM (Random Access Memory) 1-4 serving as the work area of the CPU 1-1 and an area for storing image data read by a scanner 1-5. The known scanner 1-5 reads an original by an optical means, converts the read image into an electrical signal, and then transfers the image data to the memory 1-4. A known printer 1-6 receives the image data received by a communication control unit 1-7 through a CPU bus 1-8 and prints the image data. A known operation panel 1-2 is constituted by a keyboard including a ten-key pad and an LCD unit. The known communication unit 1-7 is connected to a network by an NCU circuit and controls a modem, thereby executing facsimile transmission protocol (CCITT recommendations T.4 and T.30).

Figure 2:
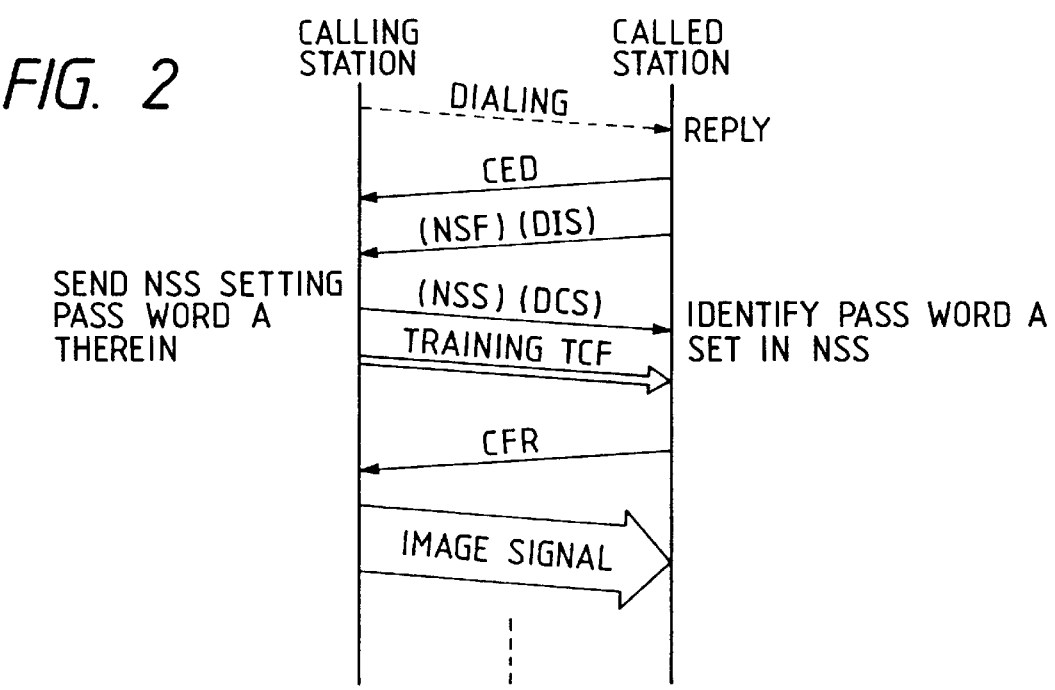
FIG. 2 is a view showing the communication procedures of the embodiment.
Figure 3:
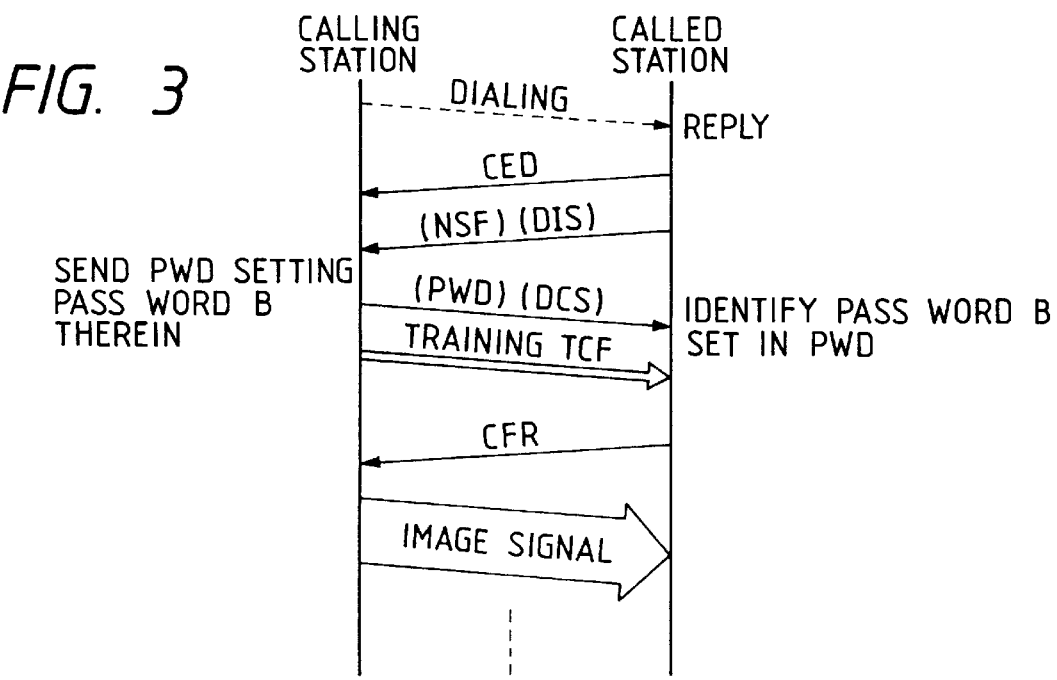
FIG. 3 is a view showing the communication procedures of the embodiment.
Figure 4:
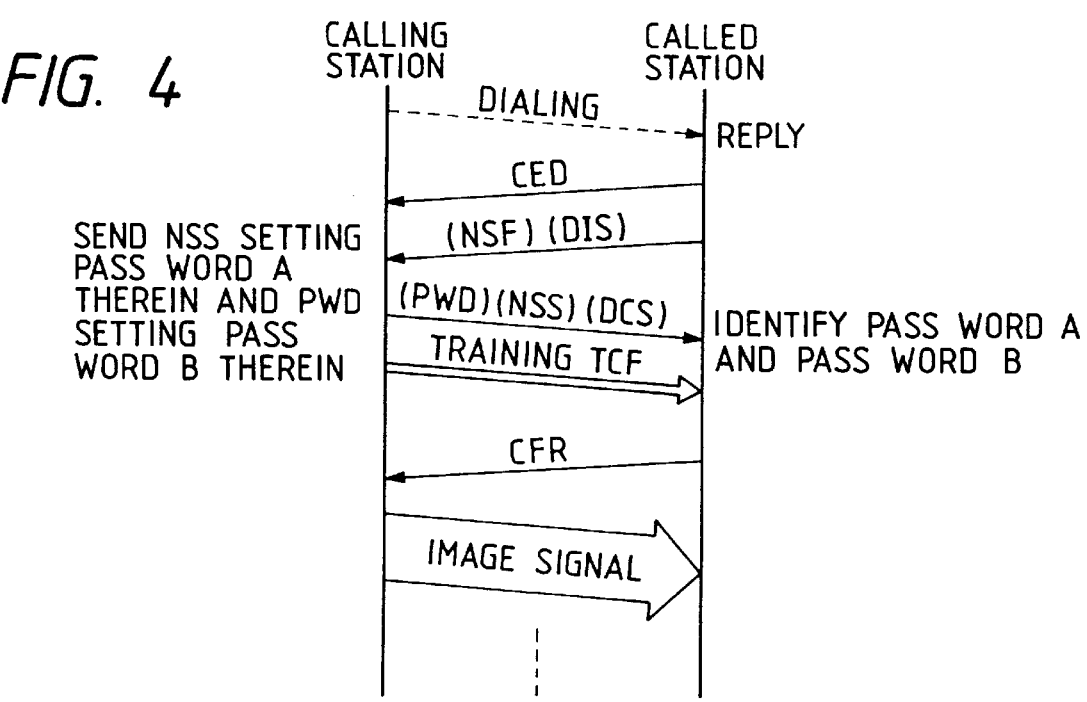
FIG. 4 is a view showing the communication procedures of the embodiment.

FIGS. 2 to 4 are views showing the password communication procedures of the apparatus according to the present invention.

FIG. 2 shows the password communication procedures using only the original procedures of a maker. NSF and NSS signals are optional signals defined in the CCITT recommendation T.30, and the original information of the maker can be set in these signals. Conventionally, password communication is performed by setting the original password information of each maker (to be referred to as a password A hereinafter) in the NSF and NSS signals. The format of the NSS signal will be described later with reference to FIG. 9. Upon reception of the NSS signal, a station identifies a maker code in the NSS signal. If the code represents the same maker, the password A information in the NSS signal is identified with the password A information registered in the apparatus. If coincident, a CFR signal is sent to receive an image signal. If not coincident, it is determined that the partner apparatus is not the member of the closed area group, thereby terminating the communication.

FIG. 3 shows the password communication procedures using only a PWD signal.

Figures 8, 9:
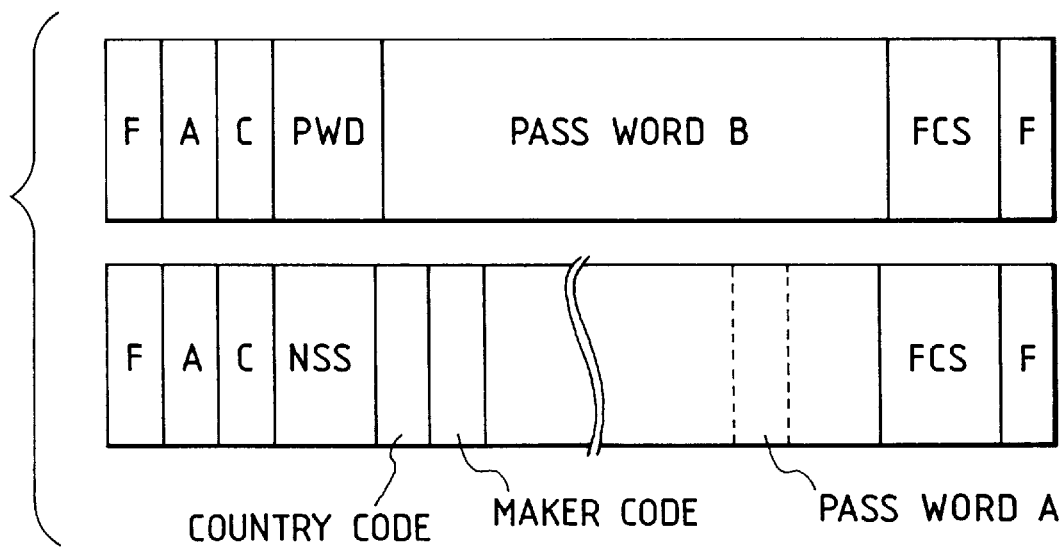
FIG. 8 is a view showing an example of setting passwords and an identify mode of the embodiment.
FIG. 9 is a view showing the formats of PWD and NSS signals of the embodiment.
Figure 10:
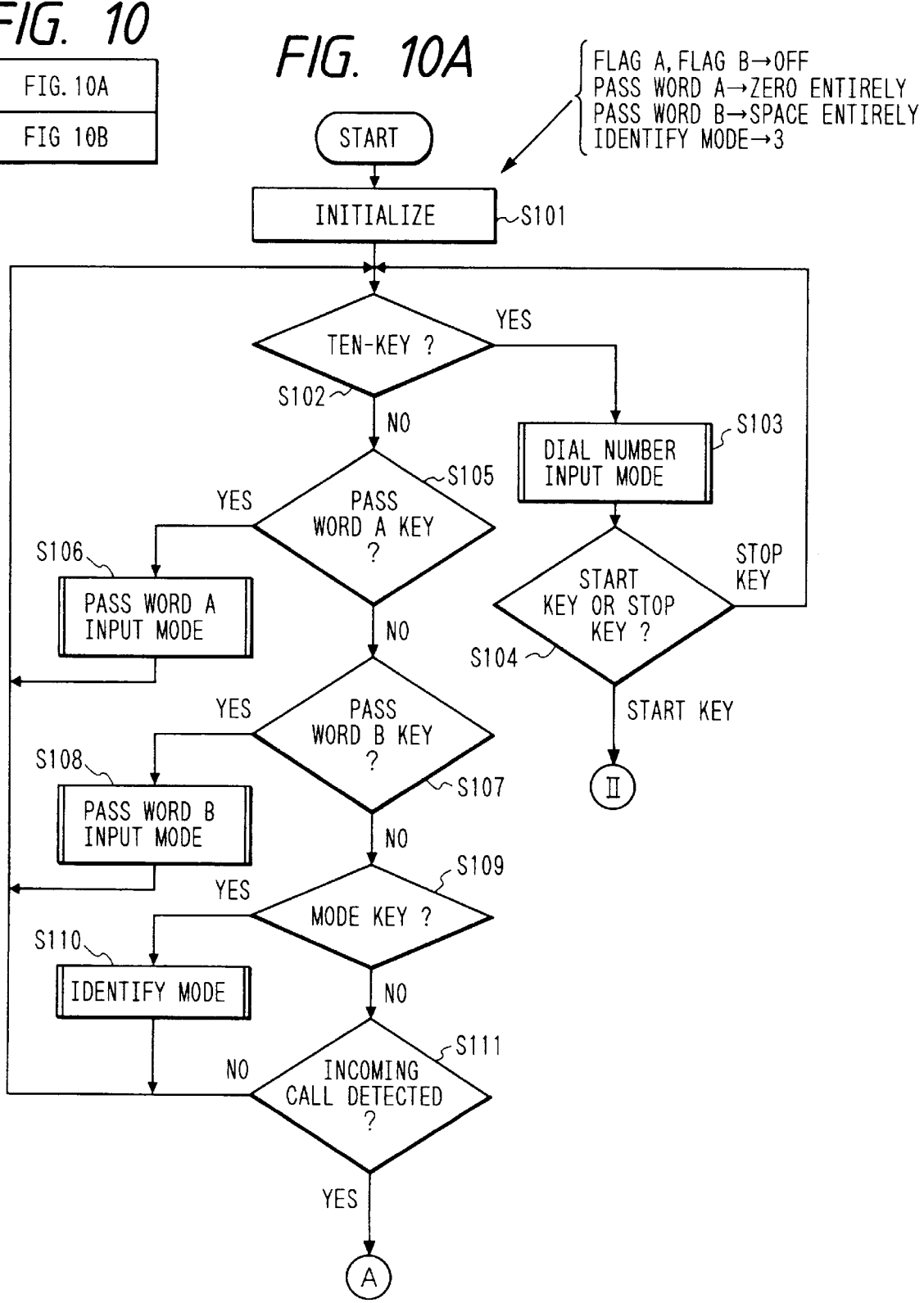
FIG. 10 is comprised of FIGS. 10A and 10B showing flow charts of the embodiment.
Figure 10B:
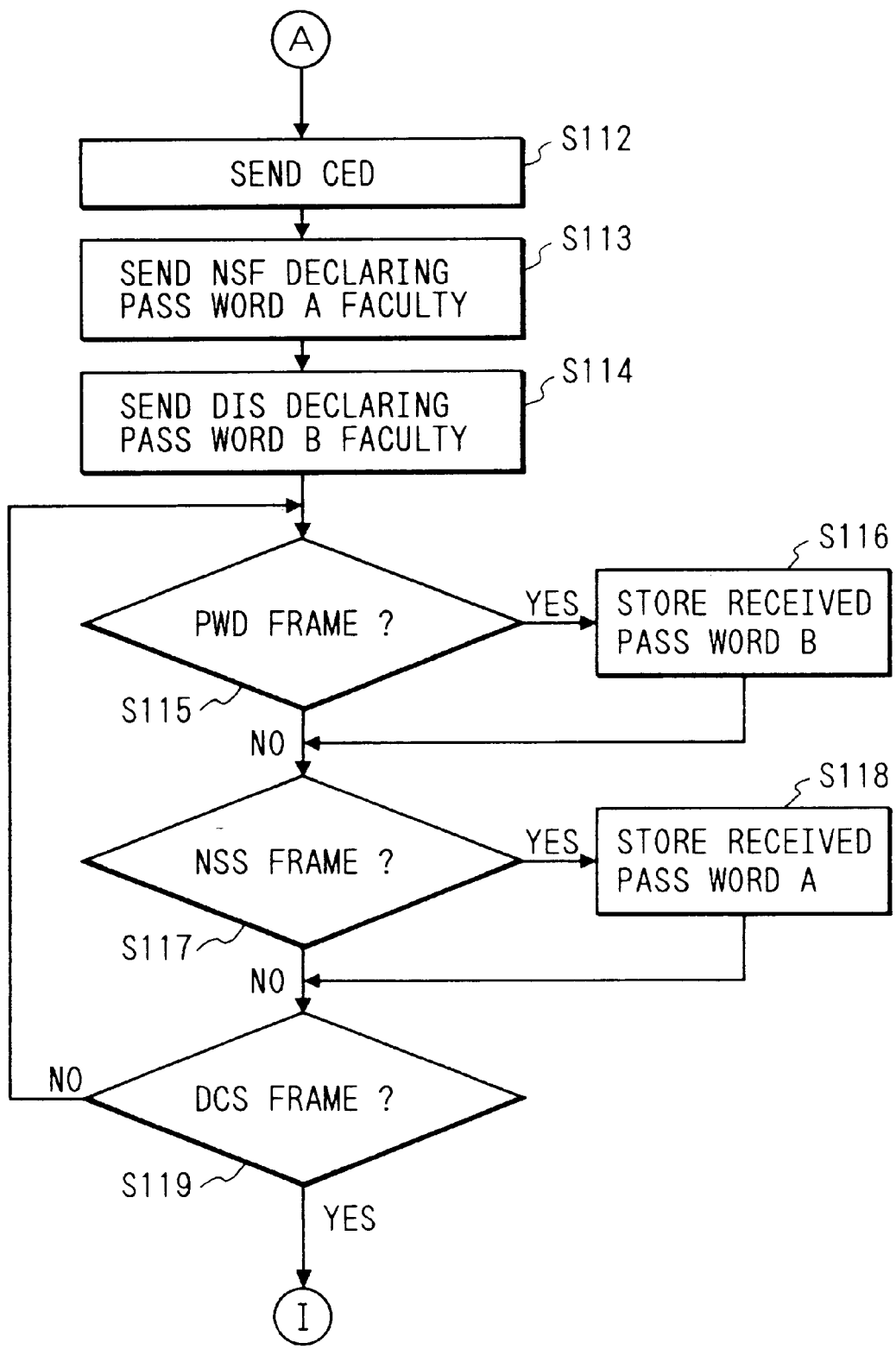

If a DIS signal declares a PWD receiving faculty, the PWD signal is sent. In the PWD signal, password information standardized in a facsimile of the G3 standards (to be referred to as a password B hereinafter) is set. The format of the PWD signal is shown in FIG. 9. Upon reception of the PWD signal, the apparatus compares the password B in the PWD signal with the password B information registered in the apparatus. If coincident, a CFR signal is sent to receive the image signal. If not coincident, it is determined that the partner apparatus is not the member of the closed area group, thereby terminating the communication.

FIG. 4 shows the password communication procedures using both the passwords A and B.

The NSF signal at a called station is checked, and the NSS signal setting the password A therein is sent. Additionally, when the DIS signal is confirmed to declare the PWD receiving faculty, the PWD signal setting the password B therein is sent. Upon reception of the passwords A and B in the PWS and NSS signals, the called station confirms the passwords A and B. If it is determined that the partner apparatus is the member of the closed area group, the CFR signal is sent to continue the communication; otherwise, the communication is terminated.

Figure 5:
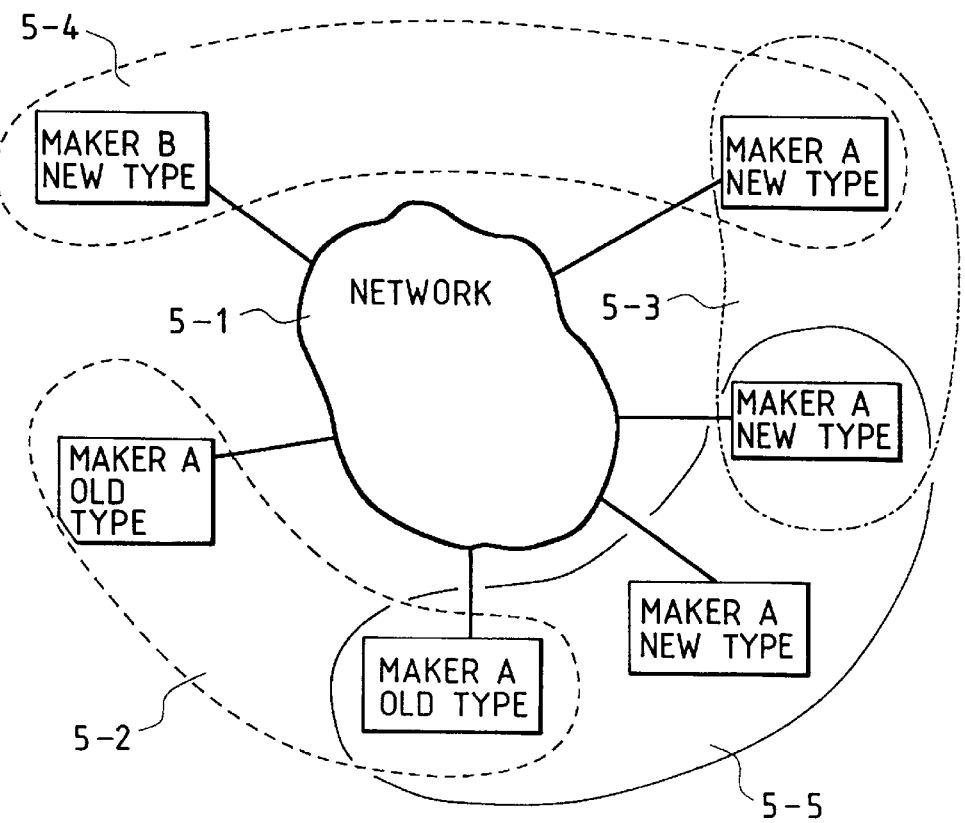
FIG. 5 is a view showing the concept of closed area groups.

FIG. 5 is a view showing a combination of stations constituting the closed area groups. FIG. 14 is a table showing signals (NSS and PWD signals) available upon password communication between the stations in FIG. 5. FIG. 15 is a table showing conceivable password identifying method in each group in FIG. 5, based on FIG. 14. FIG. 15 also shows all password communication operations of the station according to the present invention.

Figure 6:
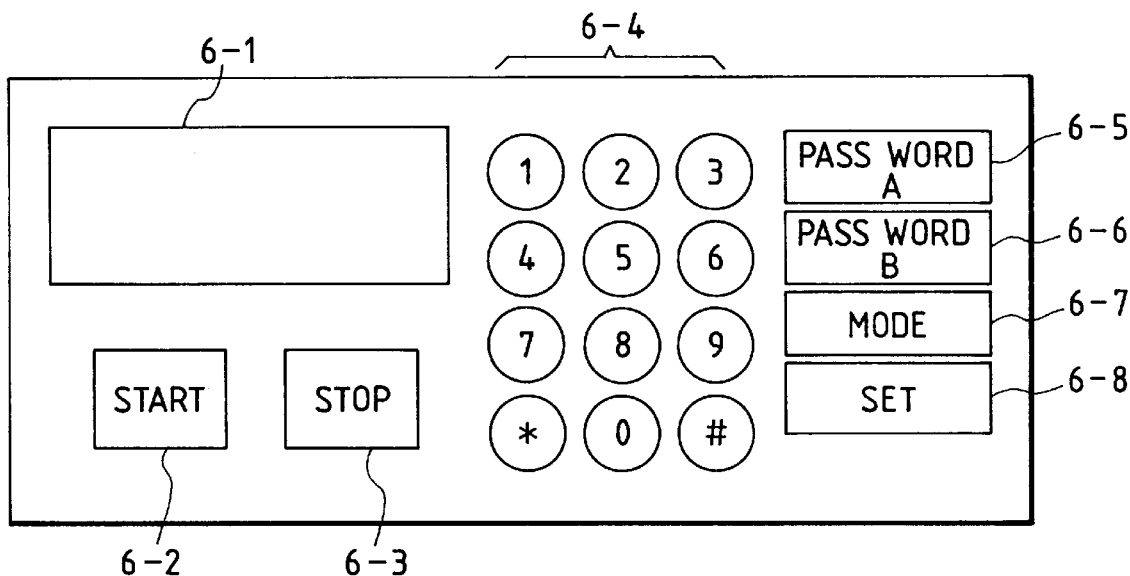
FIG. 6 is view showing the outer appearance of an operation panel of the embodiment.

FIG. 6 is a view showing the outer appearance of the operation panel 1-2 in FIG. 1. The operation panel 1-2 includes an LCD unit 6-1, a start key 6-2 for designating to start communication, a stop key 6-3 for designating to terminate the operation, a ten-key pad 6-4, register keys 6-5 and 6-6 for registering the passwords A and B, respectively, an identify mode key 6-7 used to select a password communication operation, and a set key 6-8 for defining input data from the ten-key pad and storing and registering the input data.

FIGS. 7A to 7D are views showing the operation display of an identify mode for selecting the password communication operation. When the identify mode key is depressed in a wait state, an identify mode selection display shown in FIG. 7A is set. Upon depressing the set key in the display in FIG. 7A, the password communication operation using only the password A is selected. The apparatus is then operated using only the password A. When a key "2" of the ten-key pad is depressed in the display in FIG. 7A, a display shown in FIG. 7B is set. Upon depressing the set key in this state, the password communication operation using only the password B is selected. The apparatus is then operated using only the password B. When a key "3" of the ten-key pad is depressed in the display in FIG. 7B, a display shown in FIG. 7C is set. Upon depressing the set key in this state, the password communication operation using both the passwords A and B is selected. In password identification, if either the password A or B is identified, it is determined to continue the communication. When a key "4" of the ten-key pad is depressed in the display in FIG. 7C, a display shown in FIG. 7D is set. Upon depressing the set key in this state, the password communication operation using both the passwords A and B is selected. In password identification, if both the passwords A and B are identified, it is determined to continue the communication. During this operation, the wait state is restored by the stop key.

FIG. 8 is a view showing a password registration table in the RAM 1-4 in FIG. 1. Data is set in this table when the passwords A and B, and the identify mode are registered from the operation panel.

In the apparatus of the present invention, the password A is represented by 8 bits and registered using keys "1" and "0" of the ten-key pad. The password B is represented by a character string of 20 digits. If a password of four digits is registered, spaces (20H) are set for the remaining 16 digits.

As the identify mode, ten-key information ("1", "2", "3", or "4") input as described in FIGS. 7A to 7D is registered.

FIG. 9 is a view showing the formats of the PWD and NSS signals, both of which are constituted by a frame in the HDLC scheme. In FIG. 9, the area of the password B corresponds to 20 octets, and the content of the password B in FIG. 8 is set therein. One octet of the information field of the NSS signal is ensured for the password A, and the content of the password A in FIG. 8 is set therein.

FIGS. 10A, 10B, 11, 12 and 13 are flow charts of the control unit of the apparatus according to the present invention.

When a program is started, parameters are initialized in step S101. Flags A and B are set to OFF. The password A in FIG. 8 is set to "00000000b", the password A is entirely set as spaces, and the identify mode is set to "3".

If a ten-key input is detected in step S102, the flow advances to step S103 to set a destination dial number input mode for communication. When the dial number input is completed, and a start key input is detected in step S104, the flow advances to connector II to start communication. When a stop key input is detected in step S104, the flow returns to step S102.

If a password A key input is detected in step S105, the flow advances to step S106 to set the password A input mode. If a password B key input is detected in step S107, the flow advances to step S108 to set the password B input mode. If a mode key input is detected in step S109, the flow advances to step S110 to set the identify mode.

Figure 11:
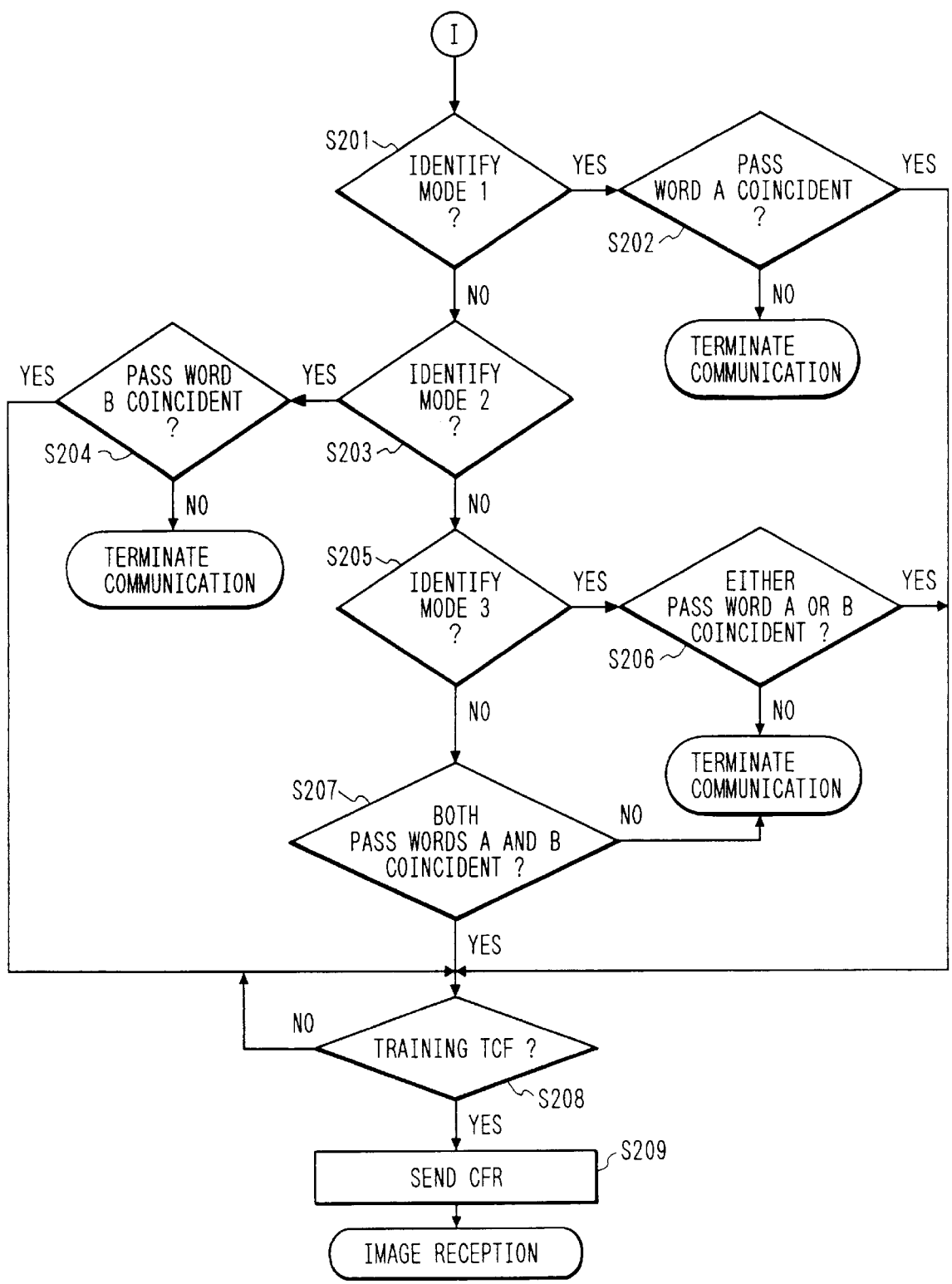
FIG. 11 is a flow chart of the embodiment.

If an incoming call from a line is detected in step S111, the flow advances to step S112. The NCU circuit in the communication unit 1–7 closes the loop of the line to connect the line, and the communication unit 1–7 sends the CED signal. In step S113, the NSF signal declaring the password A faculty is sent. In step S114, the DIS signal declaring the password B faculty is sent. Upon reception of the PWD signal from the partner apparatus (S115), the content thereof, i.e., the password B information is temporarily stored (S116). Upon reception of the NSS signal (S117), the content thereof, i.e., the password A information is temporarily stored (S118). Upon reception of the DCS signal (S119), the flow advances to step S201 (FIG. 11). If the identify mode "1" is registered in the apparatus, the flow advances to step S202 to compare the information stored in step S118 with the password A information in FIG. 8. If coincident, the flow advances to step S208. If not coincident, the communication is terminated, thereby ending the processing. If the identify mode "2" is registered in the apparatus in step S203, the flow advances to step S204 to compare the information stored in step S116 with the password B information in FIG. 8. If coincident, the flow advances to step S208. If not coincident, the communication is terminated, thereby ending the processing.

If the identify mode "3" is registered in the apparatus in step S205, the flow advances to step S206 to compare the pieces of password A and B information stored in steps S116 and S118 with the pieces of password A and B information registered in the apparatus. If either the password A or B is coincident, the flow advances to step S208. If neither are coincident, the communication is terminated, thereby ending the processing.

In step S207, the pieces of password A and B information stored in steps S116 and S118 are compared with the pieces of password A and B information registered in the apparatus. Only when both are coincident, the flow advances to step S208. If one of the passwords A and B is not coincident, or if neither are coincident, the communication is terminated, thereby ending the processing.

In step S208, a training/TCF signal sent from the partner apparatus is received, and the CFR signal is sent in step S209, thereby executing reception of the image signal.

Figure 12:
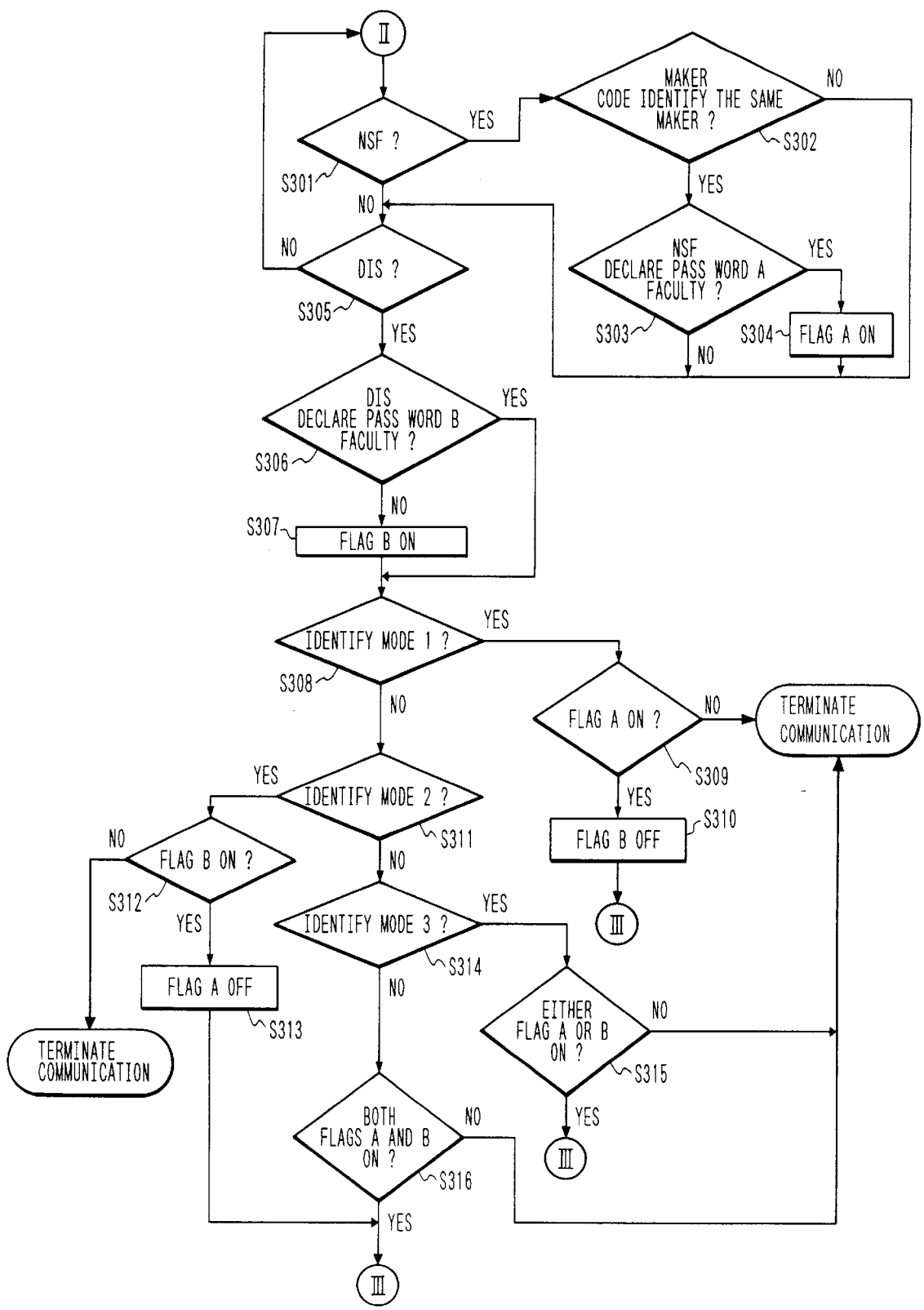
FIG. 12 is a flow chart of the embodiment.

In FIG. 12 (II in FIGS. 10A and 10B), upon reception of the NSF signal in step S301, the flow advances to step S302 to check the maker code in the NSF signal. If the maker code represents a different maker, or if no declaration of the password A faculty is detected in the NSF signal regardless of the maker code representing the same maker, the flow advances to step S305. If the maker code represents the same maker, and the declaration of the password A faculty is detected, the flag A is set to ON, and the flow advances to step S305.

Upon reception of the DIS signal in step S305, the flow advances to step S306. If the declaration of the PWD faculty is detected in the DIS signal, the flag B is set to ON, and the flow advances to step S308; otherwise, no processing is performed, and the flow advances to step S308.

Figure 13:
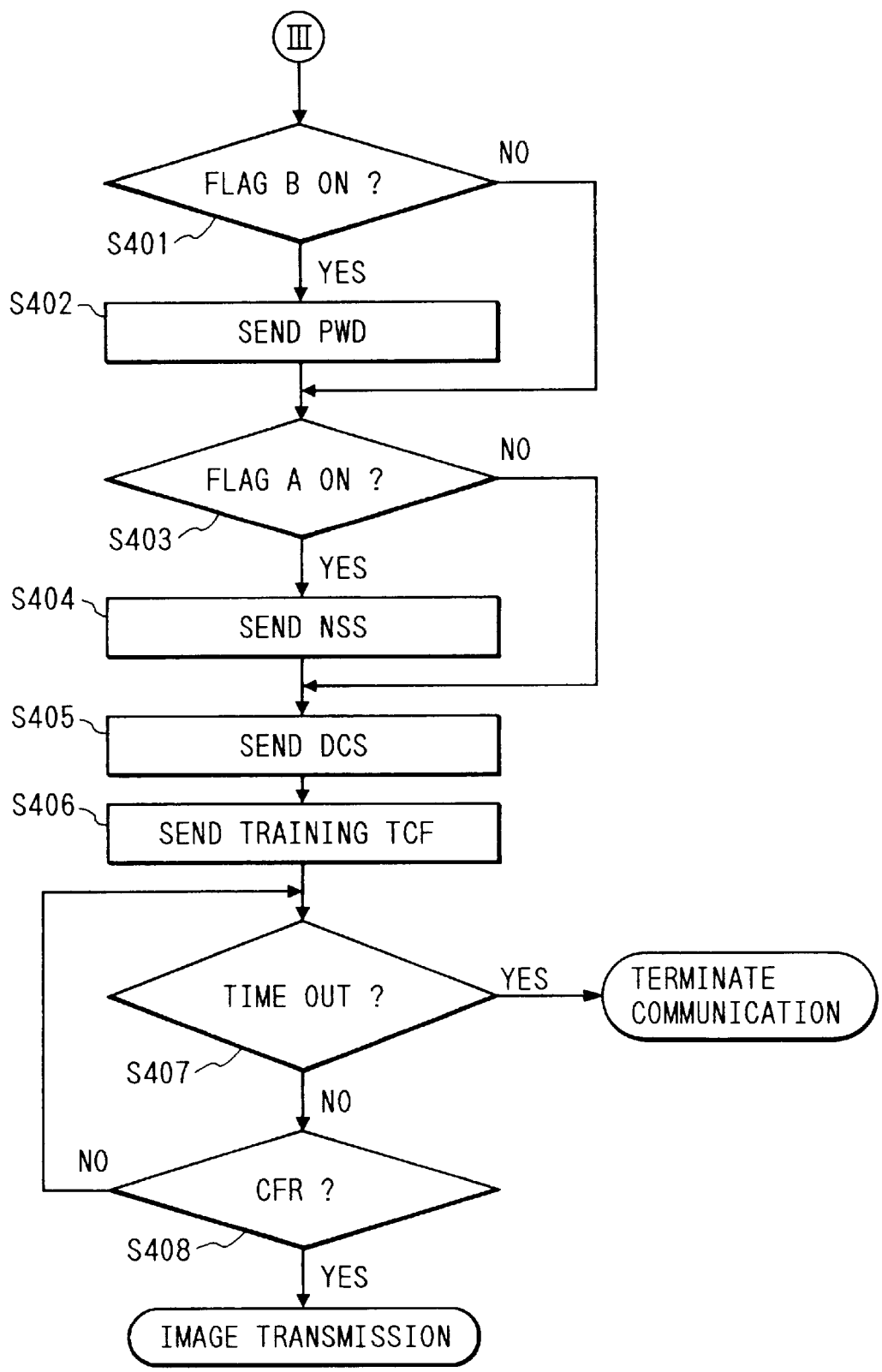
FIG. 13 is a flow chart of the embodiment.

If the identify mode "1" is registered in the apparatus in step S308, the flow advances to step S309. If the flag A is OFF, the communication is terminated, thereby ending the processing; otherwise, the flag B is set to OFF, and the flow advances to connector III (FIG. 13).

If the identify mode "2" is registered in the apparatus in step S311, the flow advances to step S312. If the flag B is OFF, the communication is terminated, thereby ending the processing; otherwise, the flag A is set to OFF, and the flow advances to connector III (FIG. 13).

If the identify mode "3" is registered in the apparatus in step S314, the flow advances to step S315. If both the flags A and B are OFF, the communication is terminated, thereby ending the processing. If either the flags A or B is ON, the flow advances to connector III (FIG. 13).

If either the flags A or B is OFF in step S316, the communication is terminated, thereby ending the processing. If both the flags A and B are ON, the flow advances to connector III (FIG. 13).

In FIG. 13 (III in FIG. 12), if the ON state of the flag B is detected in step S401, the PWD signal setting the password B in FIG. 8 therein is sent. If the ON state of the flag A is detected in step S403, the NSS signal setting the password A in FIG. 8 therein is sent. The flow advances to step S405 to send the DCS signal, and then to step S406 to send the training/TCF signal. Upon detection of reception of the CFR signal in step S408, image transmission is started.

(Another Embodiment)

In the above embodiment, the registration information to be compared with the password information received from the partner apparatus is commonly used as the registration information to be set in the PWD and NSS signals and sent to the partner apparatus, as shown in FIG. 8. However, the registration table in FIG. 8 can be easily extended such that the registration information is independently registered.

As a result of identification of the passwords A and B, if it is determined that the partner apparatus is not the member of the closed area group, the communication is terminated, and thereafter, received information from the partner apparatus, which includes the password information, can be output to the display unit 1–2 or the printer 1–6.

As has been described above, according to the present invention, there is efficiently provided an apparatus which can be effectively operated for all the closed area groups constituted by different password schemes by selecting the password identify mode, thereby satisfying the password communication operations of all the closed area groups constituted by different password schemes.

What is claimed is:

1. A facsimile apparatus comprising:
   storing means for storing a password which is used to determine whether data communication should be performed, receiving means for receiving two received passwords, each of which is one of a first type of password and a second type of password, the first type being different than the second type, comparing means for comparing the received passwords with the stored password to obtain a result, and determining means for determining that data communication should be performed when the receiving means has received the first type of password and the second type of password and the result of the comparing means is that at least one of the received passwords is coincident with the stored password.

2. A facsimile apparatus according to claim 1, further comprising transmitting means for transmitting to a partner station information indicating that at least one of the first type of password and the second type of password is receivable.

3. A facsimile apparatus according to claim 1, further comprising data receiving means for receiving facsimile data after the determining means determines that data communication should be performed.

4. A facsimile apparatus according to claim 3, wherein the determining means determines that data communication should not be performed when the result of the comparing means is that the received password is not coincident with the stored password, and further comprising communicating means for terminating communication when data communication should not be performed.

5. A facsimile apparatus according to claim 1, wherein the first type of password is according to a standardized recommendation, and the second type of password is according to a proprietary format defined by a maker of the facsimile apparatus.

6. A facsimile apparatus comprising:

receiving means for receiving two received passwords, each of which is one of a first type of password and a second type of password, the first type being different than the second type, storing means for storing a password which is used to determine whether data communication should be performed, and for storing the first type of password and the second type of password, a content of the stored first type of password being different from a content of the stored second type of password, comparing means for comparing the received passwords with the stored password to obtain a result, and determining means for determining whether data communication should be performed on the basis of the result of the comparing means.

7. A facsimile apparatus according to claim 6, wherein said determining means determines that data communication should be performed on coincidence of a received password with one of the stored passwords.

8. A facsimile apparatus according to claim 6, wherein the determining means determines that data communication should be performed when the receiving means receives the first type of password and the second type of password and the result of the comparing means is that at least one of the received passwords is coincident with the stored password.

9. A facsimile apparatus according to claim 6, further comprising transmitting means for transmitting to a partner station information indicating that at least one of the first type of password and the second type of password is receivable.

10. A facsimile apparatus according to claim 6, further comprising data receiving means for receiving facsimile data after the determining means determines that data communication should be performed.

11. A facsimile apparatus according to claim 10, wherein the determining means determines that data communication should not be performed when the result of the comparing means is that the received password is not coincident with the stored password, and further comprising communicating means for terminating communication when data communication should not be performed.

12. A facsimile apparatus according to claim 6, wherein the first type of password is according to a standardized recommendation, and the second type of password is according to a proprietary format defined by a maker of the facsimile apparatus.

13. A facsimile apparatus comprising:

receiving means for receiving two received passwords, each of which is one of a first type of password and a second type of password, the first type being different than the second type, storing means for storing a password which is used to determine whether data communication should be performed, and for storing the first type of password and the second type of password, a content of the stored first type of password being different from a content of the stored second type of password, comparing means for comparing the received password with the stored password to obtain a result, and determining means for determining that data communication should be performed when the receiving means receives the first type of password and the second type of password and the result of the comparing means is that the received passwords are respectively coincident with the stored passwords.

14. A facsimile apparatus according to claim 13, further comprising transmitting means for transmitting to a partner station information indicating that at least one of the first type of password and the second type of password is receivable.

15. A facsimile apparatus according to claim 13, further comprising data receiving means for receiving facsimile data after the determining means determines that data communication should be performed.

16. A facsimile apparatus according to claim 15, wherein the determining means determines that data communication should not be performed when the result of the comparing means is that the received password is not coincident with the stored password, and further comprising communicating means for terminating communication when data communication should not be performed.

17. A facsimile apparatus according to claim 13, wherein the first type of password is according to a standardized recommendation, and the second type of password is according to a proprietary format defined by a maker of the facsimile apparatus.

18. A facsimile apparatus comprising receiving means for receiving two received passwords, each of which is one of a first type of password and a second type of password, the first type being different than the second type, storing means for storing a password which is used to determine whether data communication should be performed, selecting means for selecting the type of stored password, comparing means for comparing the type of the stored password with the type of the received passwords to obtain a result, and determining means for determining whether data communication should be performed on the basis of the result of the comparing means.

19. A facsimile apparatus according to claim 18, wherein said selecting means selects either of the first and second types of passwords.

20. A facsimile apparatus according to claim 18, wherein said selecting means selects both of the first and second types of passwords.

21. A facsimile apparatus according to clam 18, wherein the determining means determines that data communication should be performed when the receiving means receives the first type of password and the second type of password and the result of the comparing means is that at least one of the received passwords is coincident with the stored password.

22. A facsimile apparatus according to claim 18, wherein the storing means stores the first type of password and the second type of password.

23. A facsimile apparatus according to claim 22, wherein the determining means determines that data communication should be performed when the receiving means receives the first type of password and the second type of password and the result of the comparing means is that the received passwords are respectively coincident with the stored passwords.

24. A facsimile apparatus according to claim 18, further comprising transmitting means for transmitting to a partner station information indicating that at least one of the first type of password and the second type of password is receivable.

25. A facsimile apparatus according to claim 18, further comprising data receiving means for receiving facsimile data after the determining means determines that data communication should be performed.

26. A facsimile apparatus according to claim 25, wherein the determining means determines that data communication should not be performed when the result of the comparing means is that the received password is not coincident with the stored password, and further comprising communicating means for terminating communication when data communication should not be performed.

27. A facsimile apparatus according to claim 18, wherein the first type of password is according to a standardized recommendation, and the second type of password is according to a proprietary format defined by a maker of the facsimile apparatus.

28. A method for communicating with a facsimile apparatus, comprising the steps of:
storing a password which is used to determine whether data communication should be performed,
receiving two received passwords, each of which is one of a first type of password and a second type of password, the first type being different than the second type,
comparing the received passwords with the stored password to obtain a result, and
determining that data communication should be performed when the first and second types of passwords are received and the result is that at least one of the received passwords is coincident with the stored password.

29. A method according to claim 28, further comprising the step of transmitting to a partner station information indicating that at least one of the first type of password and the second type of password is receivable.

30. A method according to claim 28, further comprising the step of receiving facsimile data after the step of determining determines that data communication should be performed.

31. A method according to claim 30, wherein the step of determining determines that data communication should not be performed when the result is that the received password is not coincident with the stored password, and further comprising the step of terminating communication when data communication should not be performed.

32. A method according to claim 28, wherein the first type of password is according to a standardized recommendation, and the second type of password is according to a proprietary format defined by a maker of the facsimile apparatus.

33. A method for communicating with a facsimile apparatus, comprising the steps of:
receiving two received passwords, each of which is one of a first type of password and a second type of password, the first type being different than the second type,
storing the first type of password and the second type of password, a content of the stored first type of password being different from a content of the stored second type of password, the stored passwords being used to determine whether data communication should be performed,
comparing the received passwords with the stored password to obtain a result, and
determining whether data communication should be performed on the basis of the result.

34. A method according to claim 33, wherein the step of determining determines that data communication should be performed on coincidence of a received password with one of the stored passwords.

35. A method according to claim 33, wherein the step of determining determines that data communication should be performed when the step of receiving receives the first type of password and the second type of password and the result of the step of comparing is that at least one of the received passwords is coincident with the stored password.

36. A method according to claim 33, further comprising the step of transmitting to a partner station information indicating that at least one of the first type of password and the second type of password is receivable.

37. A method according to claim 33, further comprising the step of receiving facsimile data after the step of determining determines that data communication should be performed.

38. A method according to claim 37, wherein the step of determining determines that data communication should not be performed when the result is that the received password is not coincident with the stored password, and further comprising the step of terminating communication when data communication should not be performed.

39. A method according to claim 33, wherein the first type of password is according to a standardized recommendation, and the second type of password is according to a proprietary format defined by a maker of the facsimile apparatus.

40. A method for communicating with a facsimile apparatus, comprising the steps of:
receiving two received passwords, each of which is one of a first type of password and a second type of password, the first type being different than the second type,
storing the first type of password and the second type of password, a content of the stored first type of password being different from a content of the stored second type of password, the stored passwords being used to determine whether data communication should be performed,
comparing the received passwords with the stored password to obtain a result, and determining that data communication should be performed when the first and second types of password are received and the result is that the received passwords are respectively coincident with the stored passwords.

41. A method according to claim 40, further comprising the step of transmitting to a partner station information indicating that at least one of the first type of password and the second type of password is receivable.

42. A method according to claim 40, further comprising the step of receiving facsimile data after the step of determining determines that data communication should be performed.

43. A method according to claim 42, wherein the step of determining determines that data communication should not be performed when the result is that the received password is not coincident with the stored password, and further comprising the step of terminating communication when data communication should not be performed.

44. A method according to claim 40, wherein the first type of password is according to a standardized recommendation, and the second type of password is according to a proprietary format defined by a maker of the facsimile apparatus.

45. A method for communicating with a facsimile apparatus, comprising the steps of:

receiving two received passwords, each of which is one of a first type of password and a second type of password, the first type being different than the second type, storing a password which is used to determine whether data communication should be performed, selecting the type of stored password, comparing the type of the stored password with the type of the received passwords to obtain a result, and determining whether data communication should be performed on the basis of the result.

46. A method according to claim 45, wherein the step of selecting selects either of the first and second types of passwords.

47. A method according to claim 45, wherein the step of selecting selects both of the first and second types of passwords.

48. A method according to claim 45, wherein the step of determining determines that data communication should be performed when the step of receiving receives the first type of password and the second type of password and the result of the step of comparing is that at least one of the received passwords is coincident with the stored password.

49. A method according to claim 45, wherein the step of storing stores the first type of password and the second type of password.

50. A method according to claim 49, wherein the step of determining determines that data communication should be performed when the step of receiving receives the first type of password and the second type of password and the result of the step of comparing is that the received passwords are respectively coincident with the stored passwords.

51. A method according to claim 45, further comprising the step of transmitting to a partner station information indicating that at least one of the first type of password and the second type of password is receivable.

52. A method according to claim 45, further comprising the step of receiving facsimile data after the step of determining determines that data communication should be performed.

53. A method according to claim 52, wherein the step of determining determines that data communication should not be performed when the result is that the received password is not coincident with the stored password, and further comprising the step of terminating communication when data communication should not be performed.

54. A method according to claim 45, wherein the first type of password is according to a standardized recommendation, and the second type of password is according to a proprietary format defined by a maker of the facsimile apparatus.

55. A method for communicating with a facsimile apparatus, comprising the steps of:

storing a first password according to a standardized recommendation and a second password according to a proprietary format defined by a maker of the facsimile apparatus, receiving a received password from a partner apparatus, and determining that image data communication should be performed when the received password coincides with one of the stored first and second passwords.

56. A method for communicating with a facsimile apparatus, comprising the steps of:

storing a first password according to a standardized recommendation and a second password according to a proprietary format defined by a maker of the facsimile apparatus, receiving third and fourth passwords from a partner apparatus, and determining that image data communication should be performed when the received third and fourth passwords respectively coincide with the stored first and second passwords.

57. A facsimile apparatus comprising:

storing means for storing a password which is used to determine whether data communication should be performed, receiving means for receiving two received passwords, each of which is one of a first type of password and a second type of password, the first type being different than the second type, comparing means for comparing the received passwords with the stored password to obtain a result, and determining means for determining whether data communication should be performed on the basis of the result of the comparing means, wherein the determining means determines that data communication should be performed when the receiving means receives the first type of password and the second type of password and the result of the comparing means is that a predetermined one of the first and second types of received passwords is coincident with the stored password.

58. A facsimile apparatus according to claim 57, further comprising transmitting means for transmitting to a partner station information indicating that at least one of the first type of password and the second type of password is receivable.

59. A facsimile apparatus according to claim 57, further comprising data receiving means for receiving facsimile data after the determining means determines that data communication should be performed.

60. A facsimile apparatus according to claim 59, wherein the determining means determines that data communication should not be performed when the result of the comparing means is that the received password is not coincident with the stored password, and further comprising communicating means for terminating communication when data communication should not be performed.

61. A facsimile apparatus according to claim 57, wherein the first type of password is according to a standardized recommendation, and the second type of password is according to a proprietary format defined by a maker of the facsimile apparatus.

62. A method for communicating with a facsimile apparatus, comprising the steps of:

storing a password which is used to determine whether data communication should be performed, receiving two received passwords, each of which is one of a first type of password and a second type of password, the first type being different than the second type, comparing the received passwords with the stored password to obtain a result, and determining whether data communication should be performed on the basis of the result of the comparing means, wherein the step of determining determines that data communication should be performed when the receiving means receives the first type of password and the second type of password and the result of the comparing means is that a predetermined one of the first and second types of received passwords is coincident with the stored password.

63. A method according to claim 62, further comprising the step of transmitting to a partner station information indicating that at least one of the first type of password and the second type of password is receivable.

64. A method according to claim 62, further comprising the step of receiving facsimile data after the step of determining determines that data communication should be performed.

65. A method according to claim 64, wherein the step of determining determines that data communication should not be performed when the result is that the received password is not coincident with the stored password, and further comprising the step of terminating communication when data communication should not be performed.

66. A method according to claim 62, wherein the first type of password is according to a standardized recommendation, and the second type of password is according to a proprietary format defined by a maker of the facsimile apparatus.

* * * * *